United States Patent
Atkisson

(10) Patent No.: US 9,483,404 B2
(45) Date of Patent: Nov. 1, 2016

(54) WRITE ADMITTANCE POLICY FOR A MEMORY CACHE

(71) Applicant: Longitude Enterprise Flash S.a.r.l., Luxembourg (LU)

(72) Inventor: David Atkisson, Draper, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/793,245

(22) Filed: Jul. 7, 2015

(65) Prior Publication Data

US 2015/0309932 A1  Oct. 29, 2015

Related U.S. Application Data

(63) Continuation of application No. 13/832,843, filed on Mar. 15, 2013, now Pat. No. 9,092,336.

(51) Int. Cl.
 *G06F 12/02* (2006.01)
 *G06F 12/08* (2016.01)

(52) U.S. Cl.
 CPC ....... *G06F 12/0833* (2013.01); *G06F 12/0246* (2013.01); *G06F 12/0802* (2013.01); *G06F 12/0806* (2013.01); *G06F 12/0888* (2013.01); *G06F 12/0804* (2013.01); *G06F 2212/62* (2013.01); *G06F 2212/621* (2013.01); *G06F 2212/7201* (2013.01)

(58) Field of Classification Search
 CPC .......... G06F 12/0833; G06F 12/0246; G06F 12/0806; G06F 12/0802; G06F 12/08; G06F 12/0888

USPC ................. 711/136, 118, 142, 143, 154, 156
See application file for complete search history.

(56) References Cited

U.S. PATENT DOCUMENTS

| | | | | |
|---|---|---|---|---|
| 5,134,563 | A * | 7/1992 | Tayler | G06F 12/0866 711/143 |
| 6,742,085 | B2 * | 5/2004 | Hill | G06F 9/383 711/137 |
| 8,316,187 | B2 * | 11/2012 | Pothireddy | G06F 12/0862 711/117 |
| 8,825,937 | B2 * | 9/2014 | Atkisson | G06F 12/0246 711/102 |
| 8,949,516 | B2 * | 2/2015 | Miura | G06F 12/0246 711/103 |
| 2012/0124294 | A1 * | 5/2012 | Atkisson | G06F 11/108 711/135 |
| 2012/0221774 | A1 * | 8/2012 | Atkisson | G06F 12/0802 711/103 |
| 2013/0086312 | A1 * | 4/2013 | Miura | G06F 12/0246 711/103 |
| 2013/0166816 | A1 * | 6/2013 | Atkisson | G06F 12/0802 711/102 |
| 2013/0166831 | A1 * | 6/2013 | Atkisson | G06F 12/0802 711/103 |

* cited by examiner

*Primary Examiner* — Stephen Elmore

(57) ABSTRACT

A method includes monitoring a number of read access requests to an address for data stored on a backing store. The method also includes comparing the number of read access requests to a read access threshold. The read access threshold includes a threshold number of read access requests for the address. The method also includes caching data corresponding to a write access request to the address in response to determining that the number of read access requests satisfies the read access threshold.

20 Claims, 7 Drawing Sheets

WRITE ADMITTANCE POLICY FOR A MEMORY CACHE

BACKGROUND

Memory devices (or "caches") connected to or otherwise in communication with a backing store are able to store data from the backing store. Storing data from the backing store on the cache allows the data to be quickly accessible to an operating system or other application, improving application performance over accessing the data directly from the backing store. Many backing stores are hard disk devices that have slower read performance than caches such as flash memory devices.

However, caches are typically limited by size such that only a portion of the data from the backing stores is able to be stored on the caches. Because of the size limitations, selecting which data should be cached is one way of improving application performance. Frequently accessed data may be stored on the cache for quick access, and data that is accessed less frequently or infrequently may not be stored on the cache and accessed directly from the backing store. A cache admittance policy determines when data being written to the backing store or read from the backing store should also be stored in the cache. Setting or adjusting the admittance policy to store the data that is most useful for application access provides efficient and easy access to the data while maximizing application performance.

Read admittance policies for memory caches are generally configured to cache data based on the number of read touch counts (read counts) or read access requests to the backing store. Thus, data on the backing store that is read or accessed most frequently is cached for quick retrieval, resulting in more efficient application performance. In some conventional memory caches, write admittance policies are configured to cache data based on the number of write touches or write access requests to the backing store. For such an admittance policy, data that is written most frequently is cached.

BRIEF DESCRIPTION OF THE DRAWINGS

Throughout the description, similar reference numbers may be used to identify similar elements.

DETAILED DESCRIPTION

Figure 1:
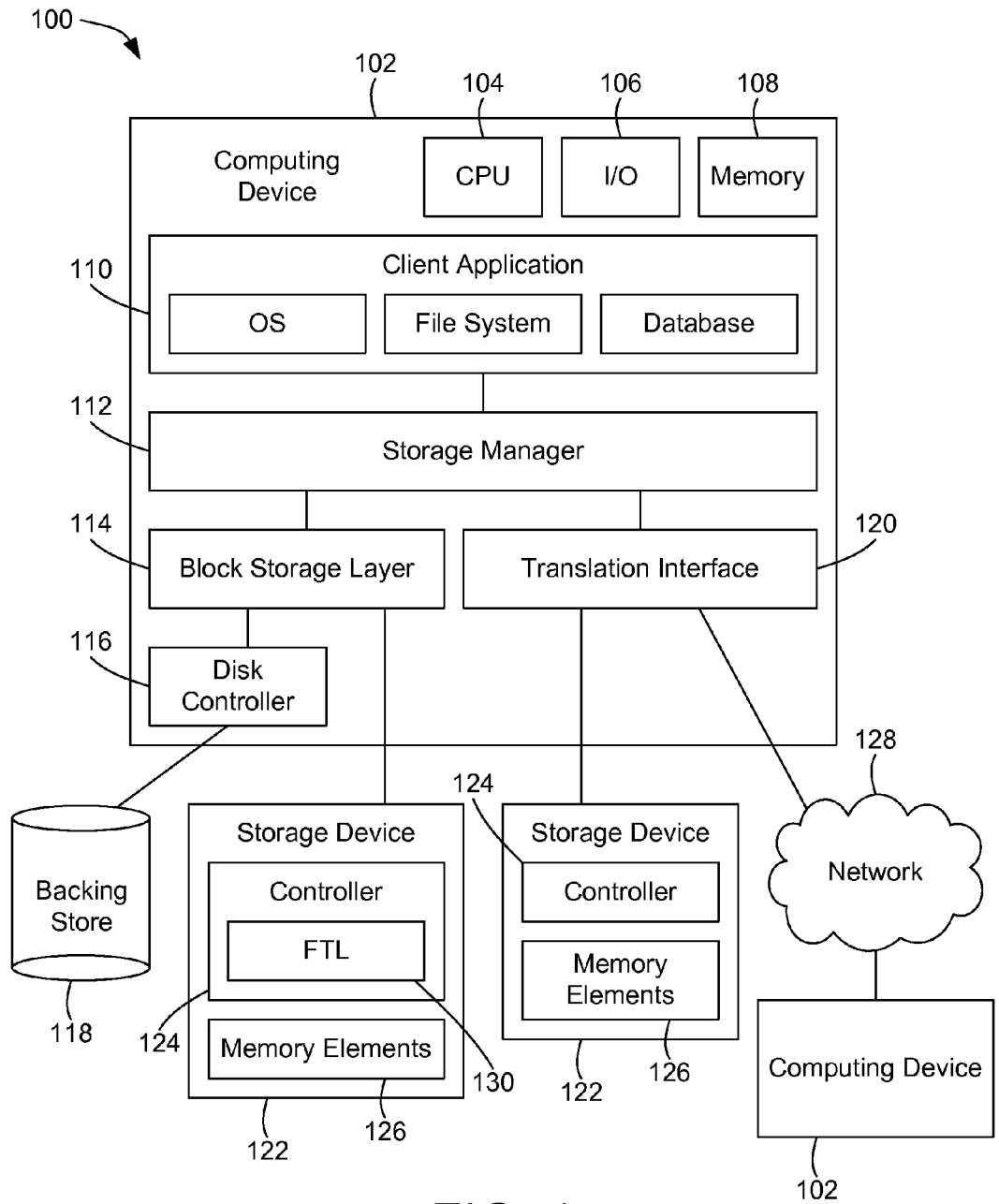
FIG. 1 depicts a schematic diagram of one embodiment of a computing device in a caching system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference to a computer readable medium may take any physical form capable of storing machine-readable instructions, at least for a time in a non-transient state, on a digital processing apparatus. A computer readable medium may be embodied by a compact disk, digital-video disk, a blu-ray disc, a magnetic tape, a Bernoulli drive, a magnetic disk, flash memory, integrated circuits, or other digital processing apparatus memory device.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate setting or adjusting a write admittance policy for a storage device. The storage device may be any type of memory device, volatile storage device or non-volatile storage device configured to store data. For example, the storage device may be a NAND flash device. In other embodiments, the storage device may be any other storage device configured to be used as a memory cache. The storage device may be connected to or in communication with a backing store. The storage device may be configured to operate as a memory cache for storing data that is stored on the backing store.

The backing store may be any type of backing store, such as a hard disk drive or other type of non-volatile storage device. The access speed (or "seek time") of hard disk drives is generally limited due to the mechanical components of the drives. The access speed of memory caches such as flash devices is generally much faster than the access speed of hard disk drives. Consequently, at least some of the data on the backing store may be stored (or "cached") on the storage device to allow an operating system or other application to quickly access the data from the storage device rather than the backing store.

However, memory caches are typically limited by the amount of data that may be stored at one time on the memory caches. Thus, memory caches have admittance policies that determine which data to store in the cache. Admittance policies may correspond to data in write operations and in read operations. A read admittance policy determines when data corresponding to a read operation to the backing store is cached in the memory cache. A write admittance policy determines when data corresponding to a write operation to the backing store is cached in the memory cache. The write admittance policy may be determined for access requests to addresses or groups of addresses, and may be modified based on various criteria. Thus, the write admittance policy for a certain group of addresses or operations corresponding to the addresses may not be a static policy, but may change from caching data to not caching data, and vice versa.

Read admittance policies are generally configured to cache data to improve read performance. By configuring the write admittance policy to cache data based on read touch counts (also referred to herein as read counts or read access requests), a memory cache may further improve read performance for applications accessing data stored on the backing store. As used herein, a read touch count may include any read access request to a particular sector or portion of the backing store. A write touch count may include any write access request to a particular sector or portion of the backing store. In some embodiments, the write admittance policy may be changed from a write-around policy when the number of read touch counts for the particular sector of the backing store does not satisfy a read touch threshold. The read touch threshold is also referred to herein as a read threshold or a read access threshold. The read touch threshold may include or may be determined based on a threshold number of read touch counts to the corresponding portion of the backing store. Thus, if the number of read touch counts for the corresponding portion of the backing store satisfies the read touch threshold, the write admittance policy is set or otherwise configured to cache data corresponding to additional write access requests to the corresponding portion of the backing store. If the number of read touch counts does not satisfy the read touch threshold, the write admittance policy is set or otherwise configured to write data directly to the backing store without caching the data.

FIG. 1 depicts a schematic diagram of one embodiment of a computing device 102 in a caching system 100. The depicted caching system 100 includes various components, described in more detail below, that are capable of performing the functions and operations described herein. In one embodiment, at least some of the components of the caching system 100 are implemented on the computing device 102. For example, the functionality of one or more components of the network system may be implemented by computer program instructions stored and executed on the computing device 102. The caching system 100 may be implemented in a clustered environment or network 128 with additional computer devices. The computing device 102 may include various components, including a processor 104 (such as a CPU), input/output devices 106, a memory device 108, a storage manager 112, a block storage layer 114, a translation interface 120, and a disk controller 116. In some embodiments, the computing device 102 includes a backing store 118. In other embodiments, the backing store 118 is not contained within the computing device 102, but may be a standalone backing store 118 or part of another computing device 102 or system. The computing device 102 may also include or be connected to one or more storage devices 122 configured to act as a memory cache. Some or all of the components of the caching system 100 may be stored on a single computing device 102 or on a network 128 of computing devices 102, including a wired and/or wireless communication network. The caching system 100 may include more or fewer components or subsystems than those depicted herein. In some embodiments, the caching system 100 may be used to implement the methods described herein.

The illustrated caching system 100 also includes a client application 110. The client application 110 may be any application that submits read access requests and/or write access requests to the backing store to write data to or read data from the backing store. For example, the client application 110 may be an operating system (OS), a file system, a database, or some other application capable of submitting read/write access requests for data stored on the backing store 118. In one embodiment, the access requests are directed to the backing store 118. In another embodiment, the access requests are directed to another component in the caching system 100 that has knowledge of the location of the data on the backing store. In general, the client application 110 operates in conjunction with the storage manager 112 to access data from either the storage device 122 or the backing store 118. In one embodiment, the storage manager 112 accesses the storage device 122 via the block storage layer 114. The storage manager 112 may be implemented via software in some embodiments. The block storage layer 114 may be implemented in a device driver or a volume manager. The block storage layer 114 provides support to the storage manager for block-based file systems, including traditional file systems, database systems, and other software designed for magnetic disk drives. Thus, the block storage layer 114 may provide support to the storage manager 112 for both the storage device 122 and the backing store 118.

The storage device 122 in such an embodiment may include a controller 124 having an address translation layer, such as a flash translation layer 130 (FTL). The FTL maps the physical addresses of memory elements 126 to logical block addresses, which allows the block storage layer 114 to view the storage device 122 as a block-based storage device. The computing device 102 may include a disk controller 116 between the block storage layer 114 and the backing store 118 to allow the block storage layer 114 to correctly locate data or specific sectors on the backing store 118.

In another embodiment, the storage manager 112 accesses the storage device via the translation interface 120. In one embodiment, the translation interface 120 is Fusion-io's Virtual Storage Layer (VSL). The translation interface 120, in one embodiment, also includes the block storage layer 114. The controller 124 on the storage device 122 exposes direct access to memory elements 126 on the storage device 122 to the translation interface 120. The translation interface 120 may be implemented at a device driver level which may cooperate with hardware support offered by the controller on or corresponding to the storage device 122. The translation interface 120 is able to implement the function of the FTL 130 for the storage device 122 to map physical addresses for the memory elements 126 to logical addresses or virtual block addresses. Implementing the functions of the FTL 130 at the translation interface 120 eliminates the need for the FTL 130 at the controller 124 on the storage device 122.

The FTL 130 and/or translation interface 120 may map the physical addresses of blocks or groups of memory elements 126 in the storage device(s) to logical addresses such as logical block addresses (LBAs) used by the operating system. As used herein, the FTL/translation interface are also described as an address translation layer (ATL). In one embodiment, the ATL operates independent of an existing operating system and file system to map physical addresses such as physical block addresses (PBAs) of the memory elements 126 to the LBAs in an organized structure. In other embodiments, the ATL operates in conjunction with an existing operating system on the computing device 102 to map the physical addresses of the memory elements 126 to the LBAs. The LBAs allow the ATL to maintain a logical organization for the storage device while potentially storing related data in different physical locations in the storage device. The ATL may also manage where data is written so that data is written to the correct locations in the storage device 122 based on where the storage device 122 has been cleaned or erased, so that subsequent access requests to the data are directed to the correct physical locations in the storage device 122. These operations performed by the ATL allow the storage device 122 to be used by an operating system or file system in a way that is similar to other block storage devices such as the backing store 118.

The ATL also may map the LBAs to PBAs on the backing store, in an embodiment in which the backing store is not a block-based storage device. This may allow the ATL to manage and track the data on the backing store. In one embodiment, the ATL maps an LBA to a single PBA of the backing store.

In another embodiment, the ATL manages storing block allocation information for each read/write block within the storage device 122. Each read/write block corresponds to a virtual block presented by the ATL to the operating system and higher level software layers. Within the storage device 122, the read/write blocks are subdivisions of erase units, which may include one or more erase blocks. Each read/write block also corresponds to a physical address (or group of physical addresses) of the memory elements 126 associated with the read/write block. Using this addressing approach, the ATL may translate the logical address of a virtual block to a logical address of a corresponding read/write block, which can be translated to a physical address of the corresponding memory elements 126 (e.g., as a page of memory elements 126). In order to facilitate these mappings, the ATL may manage various data structures. For example, the ATL may manage a block allocation map (BAM) for each erase unit to indicate an allocation status of each read/write block. In one embodiment, the status of each read/write block may be free, deleted, bad, or allocated. As another example, the ATL may manage a virtual block map (VBM) to map the virtual blocks to the logical addresses of the read/write blocks within the storage device 122. The VBM may be stored on the storage device 122 and/or on a separate memory device such as RAM. If stored on the storage device 122, a virtual page map (VPM) may be stored remotely from the storage device 122 (e.g., on the RAM) to indicate the location(s) of the page(s) used for the VBM. The ATL also includes functionality to map the logical addresses of the read/write blocks to the corresponding physical addresses of the memory elements 126 within the storage device 122.

The storage device 122 may be any kind of storage device 122. The storage device 122 may be a non-volatile storage device in which data stored on the storage device 122 persists across reboots, such that on reboot of the storage device 122, the data may need to be invalidated for various reasons. These reasons may include, but are not limited to, changes in the data for the corresponding locations on the backing store and/or storing information related to the ATL in volatile memory which is erased during a reboot.

In one embodiment, memory elements 126 in the storage device 122 for storing data are organized in an array or in multiple arrays. The storage device 122 may be a caching device implemented using any known caching technology. In some embodiments, the memory elements 126 are part of an integrated circuit (IC) package or chip. Each chip may include one or more die, and each die includes an array of memory elements 126.

The storage device 122 may be used for storing data associated with the computing device 102 or other computing devices 102 connected to a network 128. Although the computing device 102 is shown with two storage devices 122, other embodiments of the computing device 102 may include one or more than one storage device 122. Similarly, multiple storage devices 122 may be implemented at various locations within the nodes of the network 128. Embodiments of the network 128 may provide dedicated or shared memory resources for one or more of the computing devices 102, though other implementations of storage/memory resources or capacity may be used in conjunction with the network 128.

The memory elements 126 may be operated in a variety of modes. In general, solid-state memory elements 126 can be set to different programmable states that correspond to different bits or bit combinations. In a specific example, the memory elements 126 may be operated in a single level cell (SLC) mode to store a single bit of data. In another example, the memory elements 126 may be operated in a multiple level cell (MLC) mode to store two or more bits of data. In another example, the memory elements 126 may be MLC memory elements configured to operate in an SLC mode. In other embodiments, the storage device 122 includes other types of memory elements 126.

Although the components of the caching system 100 are shown separately, one or more components may provide some or all of the functionality of other components in the caching system 100. For example, while the storage manager 112 is depicted between the client application and the block storage layer 114 and translation interface 120, some or all of the functionality of the storage manager 112 may be implemented at the client application or at either the block storage layer 114 or the translation interface 120. Conversely, some or all of the functionality of the block storage layer 114 and translation interface 120 may be implemented at the storage manager 112.

When data requested from the backing store 118 is not stored on the storage device 122, the data is accessed from the backing store 118. When data requested from the backing store 118 is stored on the storage device 122, the data may be accessed from the storage device 122 instead of the backing store 118. Accessing the data from the backing store 118 is generally much slower than accessing data from the storage device 122, particularly for random access to data on the backing store 118. Random access to magnetic drives such as standard hard disk drives takes longer than random access to a flash device. Random access to standard hard disk drives also takes longer than sequential access to the hard disk drives. Thus, storing frequently accessed data on the storage device 122 may significantly improve the performance of the client application due to faster read access of the cached data.

The storage device 122 accepts data for caching based on an admittance policy to the storage device 122. The storage device 122 may have different read admittance policies and write admittance policies. A read admittance policy is a policy that determines when to cache data to the storage device 122 in response to receiving a read access request to read data from the backing store 118. A write admittance policy is a policy that determines when to cache data to the storage device 122 in response to receiving a write access request to write data to the backing store 118. Various write admittance policies that may be used in accordance with the caching system 100 include a write-around policy, a write-through policy, and a write-back policy.

As used herein, a write-around policy includes write admittance policies to memory caches or storage devices 122 in which write operations to the backing store 118 do not cache the data corresponding to the write operations in the storage devices. A write-through policy includes write admittance policies in which write operations to the backing store 118 write data to the storage device 122 and to the backing store 118 simultaneously (or approximately simultaneously), such that the data is cached before completion of the write operation. The write admittance policy may be implemented at the storage manager 112, in one example. A write-back policy includes write admittance policies in which write operations to the backing store 118 first write the data to the storage device 122 and then later write the data from the storage device 122 to the backing store 118.

As described herein, the write admittance policy may be determined based on a comparison of a number of read touch counts, or read access requests, to a particular sector or block of the backing store 118 and a threshold number of read touch counts. The threshold number of read touch counts may be a static number or a variable number. If the number of read touch counts is equal to or greater than the threshold number of read touch counts, the write admittance policy may be a write-through or write-back policy, such that data corresponding to a write access request to the backing store 118 is cached in the storage device 122. If the number of read touch counts is less than the threshold number of read touch counts, the write admittance policy is a write-around policy, such that the data corresponding to the write access request is not cached.

Figure 2:
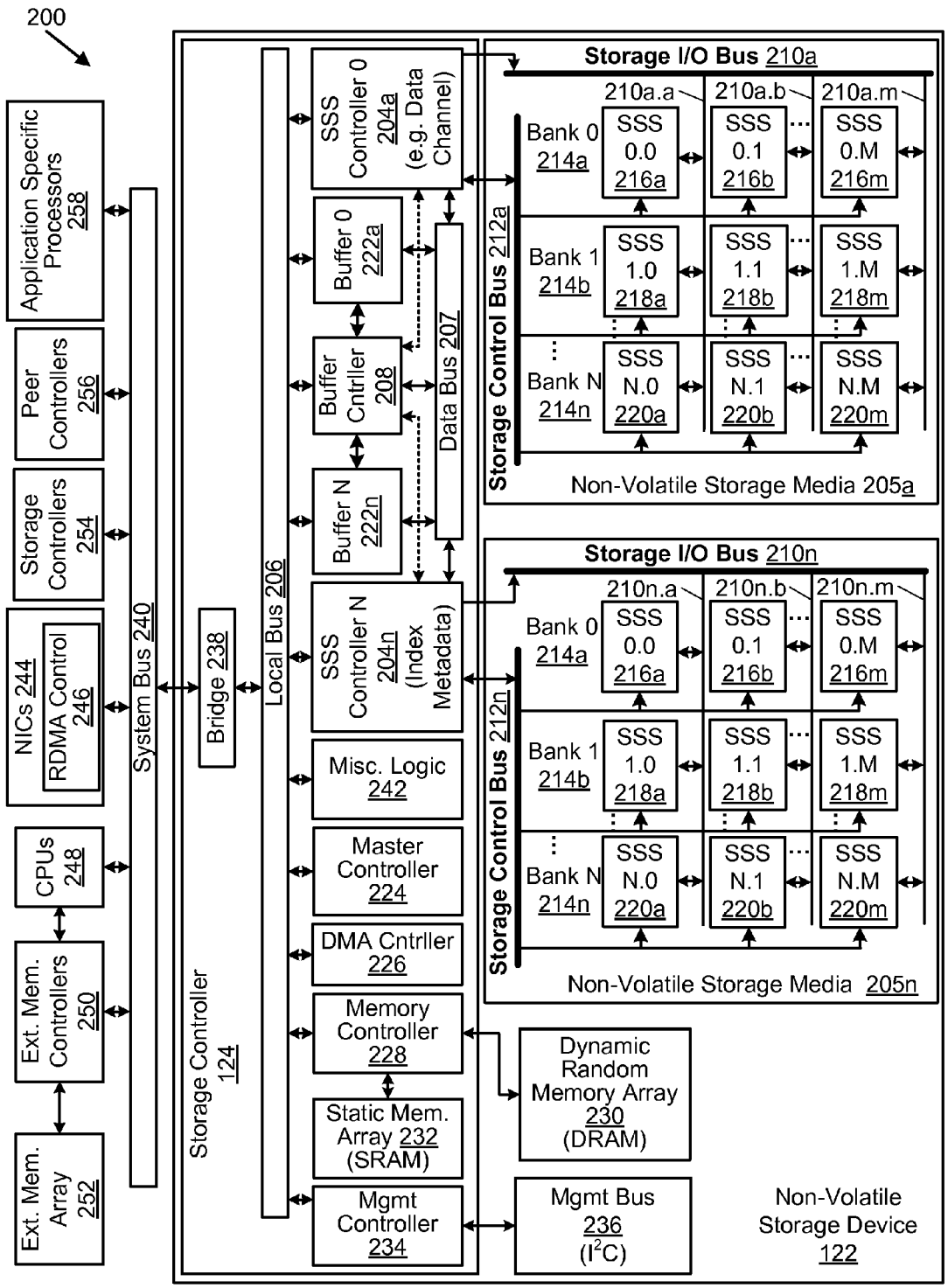
FIG. 2 depicts a schematic diagram of one embodiment of a non-volatile storage device.

FIG. 2 depicts a schematic diagram of one embodiment 200 of a non-volatile storage device 122 that includes a non-volatile storage device controller 124. In one embodiment, the storage device controller 124 is the storage device controller of FIG. 1. The non-volatile storage device controller 124 may include a number of storage controllers 0-N 204a-n, each controlling non-volatile storage media 205. In the depicted embodiment, two non-volatile controllers are shown: non-volatile controller 0 204a and storage controller N 204n, and each controlling respective non-volatile storage media 205a-n. In the depicted embodiment, storage controller 0 204a controls a data channel so that the attached non-volatile storage media 205a stores data. Storage controller N 204n controls an index metadata channel associated with the stored data and the associated non-volatile storage media 205n stores index metadata. In an alternate embodiment, the non-volatile storage device controller 124 includes a single non-volatile controller 204a with a single non-volatile storage media 205a. In another embodiment, there are a plurality of storage controllers 104a-n and associated non-volatile storage media 205a-n. In one embodiment, one or more non-volatile controllers 104a-104n-1, coupled to their associated non-volatile storage media 205a-110n-1, control data while at least one storage controller 204n, coupled to its associated non-volatile storage media 205n, controls index metadata.

In one embodiment, at least one non-volatile controller 204 is a field-programmable gate array ("FPGA") and controller functions are programmed into the FPGA. In another embodiment, the storage controller 204 includes components specifically designed as a storage controller 204, such as an application-specific integrated circuit ("ASIC") or custom logic solution. Each storage controller 204 typically includes a write data pipeline 301 and a read data pipeline 303, which are describe further in relation to FIG. 3. In another embodiment, at least one storage controller 204 is made up of a combination FPGA, ASIC, and custom logic components.

The non-volatile storage media 205 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 205, data cannot be read from the non-volatile storage media 205. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216a) is typically configured as a chip (a package of one or more dies) or a die on a circuit board. As depicted, a non-volatile storage element (e.g., 216a) operates independently or semi-independently of other non-volatile storage elements (e.g., 218a) even if these several elements are packaged together in a chip package, a stack of chip packages, or some other package element. As depicted, a row of non-volatile storage elements 216a, 216b, 216m is designated as a bank 214. As depicted, there may be "n" banks 214a-n and "m" non-volatile storage elements 216a-m, 218a-m, 220a-m per bank in an array of n×m non-volatile storage elements 216, 218, 220 in a non-volatile storage media 205. Of course, different embodiments may include different values for n and m. In one embodiment, a non-volatile storage media 205a includes twenty non-volatile storage elements 216a-216m per bank 214 with eight banks 214. In one embodiment, the non-volatile storage media 205a includes twenty-four non-volatile storage elements 216a-216m per bank 214 with eight banks 214. In addition to the n×m storage elements 216a-216m, 218a-218m, 220a-220m, one or more additional columns (P) may also be addressed and operated in parallel with other non-volatile storage elements 216a, 216b, 216m for one or more rows. The added P columns in one embodiment, store parity data for the portions of an ECC chunk (i.e., an ECC codeword) that span m storage elements for a particular bank. In one embodiment, each non-volatile storage element 216, 218, 220 includes single-level cell ("SLC") devices. In another embodiment, each non-volatile storage element 216, 218, 220 includes multi-level cell ("MLC") devices.

In one embodiment, non-volatile storage elements that share a common line 211 on the storage I/O bus 210a (e.g., 216b, 218b, 220b) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216a) may have one or more virtual dies per die and one or more dies per package and one or more packages stacked vertically and each virtual die may be accessed independently. In another embodiment, a non-volatile storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, 24 storage elements (e.g., SSS 0.0-SSS 0.24) 216a, 216b, . . . 216m form a logical bank 214a so that each of the eight logical banks has 24 storage elements (e.g., SSS 0.0-SSS 8.24) 216, 218, 220. Data is sent to the non-volatile storage media 205 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 includes one or more independent I/O buses (210a.a-m . . . 210n.a-m) in which the non-volatile storage elements within each column share one of the independent I/O buses that are connected to each non-volatile storage element 216, 218, 220 in parallel. For example, one independent I/O bus 210a.a of the storage I/O bus 210a may be physically connected to a first non-volatile storage element 216a, 218a, 220a of each bank 214a-n. A second independent I/O bus 210a.b of the storage I/O bus 210b may be physically connected to a second non-volatile storage element 216b, 218b, 220b of each bank 214a-n. Each non-volatile storage element 216a, 216b, 216m in a bank 214a (a row of non-volatile storage elements as illustrated in FIG. 2) may be accessed simultaneously and/or in parallel. In one embodiment, where non-volatile storage elements 216, 218, 220 include stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access in which commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of 20 non-volatile storage elements 216a, 216b, 216m would then have an 80 kB capacity of pages accessed with the same address going out the independent I/O buses of the storage I/O bus 210.

This group of pages in a bank 214 of non-volatile storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the non-volatile storage element SSS 0.0 216a with the correct page where the data packet is to be written is selected by the storage control bus 212a and other banks 214b . . . 214n of the non-volatile storage 110a are deselected.

Similarly, satisfying a read command on the storage I/O bus 210 requires a signal on the storage control bus 212 to select a single bank 214a and the appropriate page within that bank 214a. In one embodiment, a read command reads an entire page, and because there are multiple non-volatile storage elements 216a, 216b, . . . 216m in parallel in a bank 214a, an entire logical page is read with a read command. However, the read command may be broken into subcommands, as will be explained below with respect to bank interleave. Similarly, an entire logical page may be written to the non-volatile storage elements 216a, 216b, . . . 216m of a bank 214a in a write operation.

An erase block erase command may be sent out to erase an erase block over the storage I/O bus 210 with a particular erase block address to erase a particular erase block. Typically, storage controller 204a may send an erase block erase command over the parallel paths (independent I/O buses 210a-n.a-m) of the storage I/O bus 210 to erase a logical erase block, each with a particular erase block address to erase a particular erase block. Simultaneously, a particular bank (e.g., Bank 0 214a) is selected over the storage control bus 212 to prevent erasure of similarly addressed erase blocks in non-selected banks (e.g., Banks 1-N 214b-n). Alternatively, no particular bank (e.g., Bank 0 214a) is selected over the storage control bus 212 (or all of the banks are selected) to enable erasure of similarly addressed erase blocks in all of the banks (Banks 1-N 214b-n) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile storage media 205. For example, storage controller 204a streams packets to storage write buffers of a bank 214a of storage elements 216 and, when the buffers are full, the packets are programmed to a designated logical page. Storage controller 204a then refills the storage write buffers with packets and, when full, the packets are written to the next logical page. The next logical page may be in the same bank 214a or another bank (e.g., 214b). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 205. When a copy is made, a new copy of the requested data is created and a new entry is created in the index mapping the new copy of the requested data to the original packets. The new copy of the requested data is also written to the non-volatile storage media 205 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 205 and allows the storage controller 124 to monitor storage hot spots and level usage of the various logical pages in the non-volatile storage media 205. Sequentially writing packets also facilitates a powerful, efficient garbage collection system, which is described in detail below. One of skill in the art will recognize other benefits of sequential storage of data packets.

In various embodiments, the non-volatile storage device controller 124 also includes a data bus 207, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the storage controller(s) 104 communicate data to the non-volatile storage media 205 over a storage I/O bus 210. In a typical embodiment where the non-volatile storage is arranged in banks 214 and each bank 214 includes multiple storage elements 216a, 216b, 216m accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216a, 218a, 220a) may include a logical-to-physical mapping for storage divisions (e.g., erase blocks) accessed in a column of storage elements 216a, 218a, 220a. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device 155 through the system bus 240, bridge 238, local bus 206, buffer(s) 222, and finally over a data bus 207. The data bus 207 typically is connected to one or more buffers 222a-n controlled with a buffer controller 208. The buffer controller 208 typically controls transfer of data from the local bus 206 to the buffers 222 and through the data bus 207 to the pipeline input buffer 306 and output buffer 330. The buffer controller 208 typically controls how data arriving from a requesting device can be temporarily stored in a buffer 222 and then transferred onto a data bus 207, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 207, through a non-volatile controller 204, and on to the non-volatile storage media 205 such as NAND flash or other storage media. In one embodiment, data and associated out-of-band metadata ("metadata") arriving with the data is communicated using one or more data channels comprising one or more storage controllers 104a-104n-1 and associated non-volatile storage media 205a-110n-1 while at least one channel (storage controller 204n, non-volatile storage media 205n) is dedicated to in-band metadata, such as index information and other metadata generated internally to the non-volatile storage device 122.

The local bus 206 is typically a bidirectional bus or set of busses that allows for communication of data and commands between devices internal to the non-volatile storage device controller 124 and between devices internal to the non-volatile storage device 122 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a host computing system 114 or other device in which the non-volatile storage device 122 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 122 may be packaged to fit internally to a device or as an externally connected device.

The non-volatile storage device controller 124 includes a master controller 224 that controls higher-level functions within the non-volatile storage device 122. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile storage device controller 124 manages multiple data storage devices/non-volatile storage media 205a-n, the master controller 224 divides the work load among internal controllers, such as the storage controllers 104a-n. For example, the master controller 224 may divide an object to be written to the data storage devices (e.g., non-volatile storage media 205a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, includes the FTL of FIG. 1 to emulate block storage such that a host computing system 114 or other device connected to the storage device/non-volatile storage device 122 views the storage device/non-volatile storage device 122 as a block storage device and sends data to specific physical addresses in the storage device/non-volatile storage device 122. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/non-volatile storage device 122 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to the computer network 116 through an I/O memory driver using a standard stack API and operating in conjunction with NICs 244.

In one embodiment, the master controller 224 is also a redundant array of independent drive ("RAID") controller. Where the data storage device/non-volatile storage device 122 is networked with one or more other data storage devices/non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may include many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 122 may appear as a storage device connected through a SCSI bus, Internet SCSI ("iSCSI"), fiber channel, etc. Meanwhile the storage device/non-volatile storage device 122 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 122 to be partitioned into multiple logical devices and allows partition-based media encryption. In yet another embodiment, the master controller 224 supports a storage controller 204 with advanced, multi-bit ECC correction. One of skill in the art will recognize other features and functions of a master controller 224 in a storage controller 124, or more specifically in a non-volatile storage device 122.

In one embodiment, the non-volatile storage device controller 124 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile storage media 205n or other non-volatile memory. One of skill in the art will recognize other uses and configurations of the memory controller 228, dynamic memory array 230, and static memory array 232.

In one embodiment, the non-volatile storage device controller 124 includes a DMA controller 226 that controls DMA operations between the storage device/non-volatile storage device 122 and one or more external memory controllers 250 and associated external memory arrays 252 and CPUs 248. Note that the external memory controllers 250 and external memory arrays 252 are called external because they are external to the storage device/non-volatile storage device 122. In addition, the DMA controller 226 may also control RDMA operations with requesting devices through a NIC 244 and associated RDMA controller 246.

In one embodiment, the non-volatile storage device controller 124 includes a management controller 234 connected to a management bus 236. Typically, the management controller 234 manages environmental metrics and status of the storage device/non-volatile storage device 122. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/non-volatile storage device 122. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/non-volatile storage device 122 by a management bus 236.

In one embodiment, the non-volatile storage device controller 124 includes miscellaneous logic 242 that may be customized for a specific application. Typically, where the non-volatile device controller 124 or master controller 224 is/are configured using a FPGA or other configurable controller, custom logic may be included based on a particular application, customer requirement, storage requirement, etc.

Figure 3:
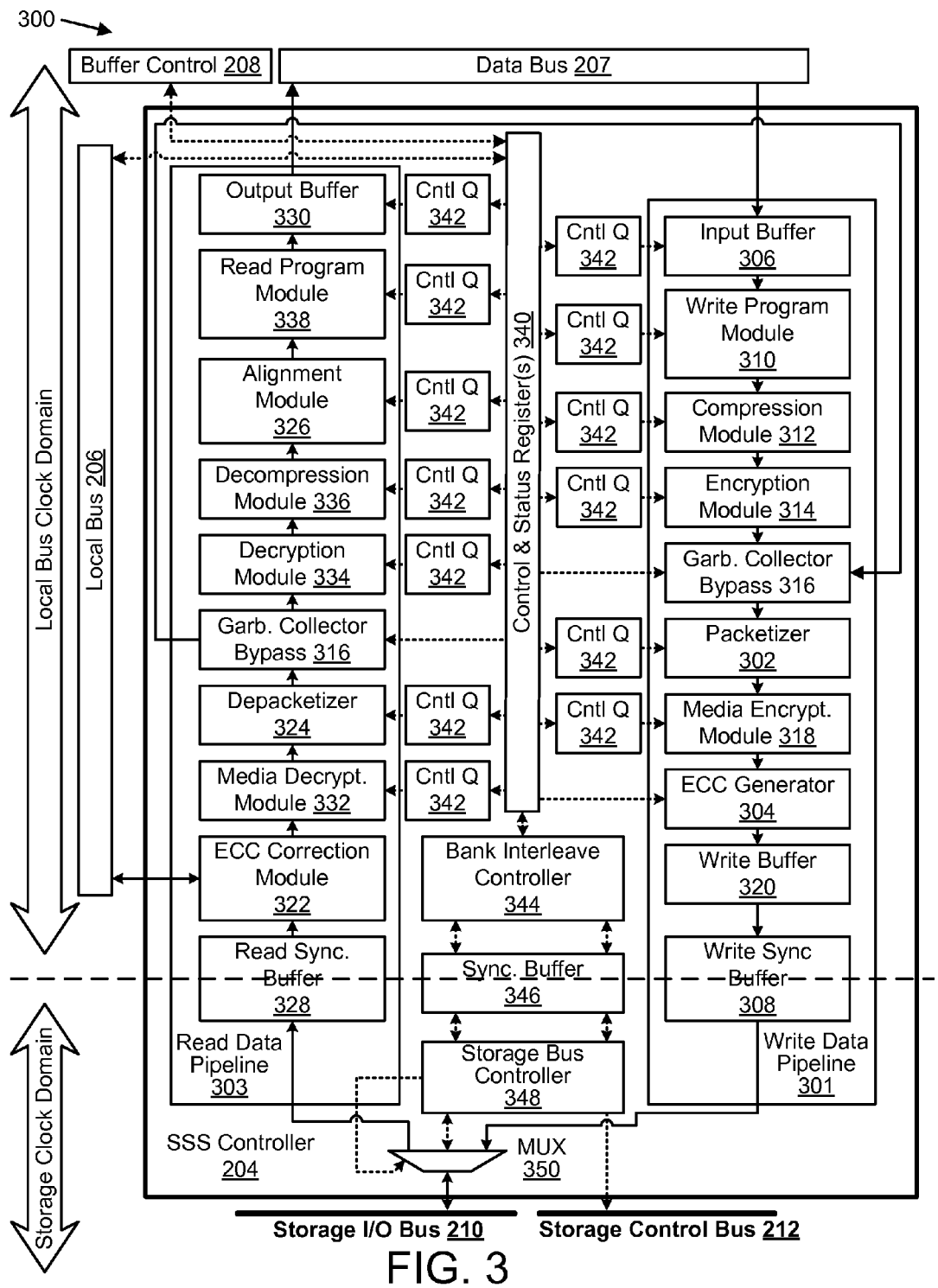
FIG. 3 depicts a schematic diagram of one embodiment of a storage controller.

FIG. 3 depicts a schematic diagram of one embodiment 300 of the storage controller 204 of FIG. 2 with a write data pipeline 301, a read data pipeline 303 and a throughput management apparatus 122 in a non-volatile storage device 122 in accordance with the present invention. The embodiment 300 includes a data bus 207, a local bus 206, and buffer control 208, which are substantially similar to those described in relation to the non-volatile storage device controller 124 of FIG. 2. The write data pipeline 301 includes a packetizer 302 and an error-correcting code ("ECC") generator 304. In other embodiments, the write data pipeline 301 includes an input buffer 306, a write synchronization buffer 308, a write program module 310, a compression module 312, an encryption module 314, a garbage collector bypass 316 (with a portion within the read data pipeline 303), a media encryption module 318, and a write buffer 320. The read data pipeline 303 includes a read synchronization buffer 328, an ECC correction module 322, a depacketizer 324, an alignment module 326, and an output buffer 330. In other embodiments, the read data pipeline 303 may include a media decryption module 332, a portion of the garbage collector bypass 316, a decryption module 334, a decompression module 336, and a read program module 338. The storage controller 204 may also include control and status registers 340 and control queues 342, a bank interleave controller 344, a synchronization buffer 346, a storage bus controller 348, and a multiplexer ("MUX") 350. The components of the non-volatile controller 204 and associated write data pipeline 301 and read data pipeline 303 are described below. In other embodiments, synchronous non-volatile storage media 205 may be used and synchronization buffers 308, 328 may be eliminated.

The write data pipeline 301 includes a packetizer 302 that receives a data or metadata segment to be written to the non-volatile storage, either directly or indirectly through another write data pipeline 301 stage, and creates one or more packets sized for the non-volatile storage media 205. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 122 in data segments streamed to the non-volatile storage device 122. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 301 includes an ECC generator 304 that that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes include an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may include more than one ECC block; the ECC block may include more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 205 to be extended. For example, if flash memory is used as the storage medium in the non-volatile storage media 205, the flash memory may be written approximately 100,000 times without error per erase cycle. This usage limit may be extended using a robust ECC algorithm. Having the ECC generator 304 and corresponding ECC correction module 322 onboard the non-volatile storage device 122, the non-volatile storage device 122 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 110 may include less reliable storage such as multi-level cell ("MLC") flash in order to increase capacity, which storage may not be sufficiently reliable without more robust ECC algorithms.

In one embodiment, the write pipeline 301 includes an input buffer 306 that receives a data segment to be written to the non-volatile storage media 205 and stores the incoming data segments until the next stage of the write data pipeline 301, such as the packetizer 302 (or other stage for a more complex write data pipeline 301) is ready to process the next data segment. The input buffer 306 typically allows for discrepancies between the rate data segments are received and processed by the write data pipeline 301 using an appropriately sized data buffer. The input buffer 306 also allows the data bus 207 to transfer data to the write data pipeline 301 at rates greater than can be sustained by the write data pipeline 301 in order to improve efficiency of operation of the data bus 207. Typically, when the write data pipeline 301 does not include an input buffer 306, a buffering function is performed elsewhere, such as in the non-volatile storage device 122 but outside the write data pipeline 301, in the host computing system 114, such as within a network interface card ("NIC"), or at another device, for example when using remote direct memory access ("RDMA").

In another embodiment, the write data pipeline 301 also includes a write synchronization buffer 308 that buffers packets received from the ECC generator 304 prior to writing the packets to the non-volatile storage media 205. The write synchronization buffer 308 is located at a boundary between a local clock domain and a non-volatile storage clock domain and provides buffering to account for the clock domain differences. In other embodiments, synchronous non-volatile storage media 205 may be used and synchronization buffers 308 328 may be eliminated.

In one embodiment, the write data pipeline 301 also includes a media encryption module 318 that receives the one or more packets from the packetizer 302, either directly or indirectly, and encrypts the one or more packets using an encryption key unique to the non-volatile storage device 122 prior to sending the packets to the ECC generator 304. Typically, the entire packet is encrypted, including the headers. In another embodiment, headers are not encrypted. In this document, encryption key is understood to mean a secret encryption key that is managed externally from a storage controller 204.

The media encryption module 318 and corresponding media decryption module 332 provide a level of security for data stored in the non-volatile storage media 205. For example, where data is encrypted with the media encryption module 318, if the non-volatile storage media 205 is connected to a different storage controller 204, non-volatile storage device 122, or server, the contents of the non-volatile storage media 205 typically could not be read without use of the same encryption key used during the write of the data to the non-volatile storage media 205 without significant effort.

In a typical embodiment, the non-volatile storage device 122 does not store the encryption key in non-volatile storage and allows no external access to the encryption key. The encryption key is provided to the storage controller 204 during initialization. The non-volatile storage device 122 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 204. In another embodiment, the non-volatile storage media 205 may have two or more partitions and the storage controller 204 behaves as though it was two or more storage controllers 104, each operating on a single partition within the non-volatile storage media 205. In this embodiment, a unique media encryption key may be used with each partition.

In another embodiment, the write data pipeline 301 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 122 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The storage device 122 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing device 102, another computer, key manager, or other device that holds the encryption key to be used to encrypt the data segment. In one embodiment, encryption keys are transferred to the storage controller 204 from one of a non-volatile storage device 122, host computing device 102, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 301 of the non-volatile storage device 122 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile storage device 122. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 205. For example, where data is encrypted with media encryption unique to the specific non-volatile storage device 122, if the non-volatile storage media 205 is connected to a different storage controller 204, non-volatile storage device 122, or host computing system 114, the contents of the non-volatile storage media 205 typically could not be read without use of the same encryption key used during the write of the data to the non-volatile storage media 205 without significant effort.

In another embodiment, the write data pipeline 301 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 122 is beneficial so that computing devices 102 or other devices writing data to the non-volatile storage device 122 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 301 includes a garbage collector bypass 316 that receives data segments from the read data pipeline 303 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 303 and then transferred directly to the write data pipeline 301 without being routed out of the storage controller 204. In one embodiment, the garbage collector bypass 316 is part of an autonomous garbage collector system that operates within the non-volatile storage device 122. This allows the non-volatile storage device 122 to manage data so that data is systematically spread throughout the non-volatile storage media 205 to improve performance, data reliability and to avoid overuse and underuse of any one location or area of the non-volatile storage media 205 and to lengthen the useful life of the non-volatile storage media 205.

The garbage collector bypass 316 coordinates insertion of segments into the write data pipeline 106 with other segments being written by computing devices 102 or other devices. In the depicted embodiment, the garbage collector bypass 316 is before the packetizer 302 in the write data pipeline 301 and after the depacketizer 324 in the read data pipeline 303, but may also be located elsewhere in the read and write data pipelines 106, 108. The garbage collector bypass 316 may be used during a flush of the write pipeline 303 to fill the remainder of the logical page in order to improve the efficiency of storage within the non-volatile storage media 205 and thereby reduce the frequency of garbage collection.

Grooming may include refreshing data stored on the non-volatile storage media 205. Data stored on the non-volatile storage media 205 may degrade over time. The storage controller 204 may include a groomer that identifies "stale" data on the non-volatile storage device 122 (data that has not been modified and/or moved for a pre-determined time), and refreshes the stale data by re-writing the data to a different storage location.

In some embodiments, the garbage collection system, groomer, and/or garbage collection bypass 316 may be temporarily disabled to allow data to be stored contiguously on physical storage locations of the non-volatile storage device 122. Disabling the garbage collection system and/or bypass 316 may ensure that data in the write data pipeline 301 is not interleaved with other data. For example, and discussed below, garbage collection and/or the garbage collection bypass 316 may be disabled when storing data pertaining to an atomic storage request.

In some embodiments, the garbage collection and/or groomer may be restricted to a certain portion of the physical storage space of the non-volatile storage device. For example, storage metadata, such as the reverse index described below, may be periodically persisted to a non-volatile storage location. The garbage collection and/or grooming may be restricted to operating on portions of the non-volatile storage media that correspond to the persisted storage metadata.

In one embodiment, the write data pipeline 301 includes a write buffer 320 that buffers data for efficient write operations. Typically, the write buffer 320 includes enough capacity for packets to fill at least one logical page in the non-volatile storage media 205. This allows a write operation to send an entire logical page of data to the non-volatile storage media 205 without interruption. By sizing the write buffer 320 of the write data pipeline 301 and buffers within the read data pipeline 303 to be the same capacity or larger than a storage write buffer within the non-volatile storage media 205, writing and reading data is more efficient since a single write command may be crafted to send a full logical page of data to the non-volatile storage media 205 instead of multiple commands.

While the write buffer 320 is being filled, the non-volatile storage media 205 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 205.

In another embodiment, the write buffer 320 is sized smaller than a logical page so that less than a page of information could be written to a storage write buffer in the non-volatile storage media 205. In the embodiment, to prevent a stall in the write data pipeline 301 from holding up read operations, data is queued using the garbage collection system that needs to be moved from one location to another as part of the garbage collection process. In case of a data stall in the write data pipeline 301, the data can be fed through the garbage collector bypass 316 to the write buffer 320 and then on to the storage write buffer in the non-volatile storage media 205 to fill the pages of a logical page prior to programming the data. In this way, a data stall in the write data pipeline 301 would not stall reading from the non-volatile storage device 122.

In another embodiment, the write data pipeline 301 includes a write program module 310 with one or more user-definable functions within the write data pipeline 301. The write program module 310 allows a user to customize the write data pipeline 301. A user may customize the write data pipeline 301 based on a particular data requirement or application. Where the storage controller 204 is an FPGA, the user may program the write data pipeline 301 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 301. In another embodiment, the write program module 310 may include a processor core that can be programmed through software.

Note that the write program module 310 is shown between the input buffer 306 and the compression module 312, however, the write program module 310 could be anywhere in the write data pipeline 301 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 303 includes an ECC correction module 322 that determines if a data error exists in ECC blocks a requested packet received from the non-volatile storage media 205 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 205 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 303. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 303. The requesting device 155 may use header information in the requested packet in order to identify data required to replace the corrupted requested packet or to replace the data structure to which the packet belongs. In another embodiment, the storage controller 204 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 303 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 303 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the non-volatile storage device 122. In another embodiment, the depacketizer 324 operation may be packet type dependent.

The read data pipeline 303 includes an alignment module 326 that receives data from the depacketizer 324 and removes unwanted data. In one embodiment, a read command sent to the non-volatile storage media 205 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 303, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 303 includes a read synchronization buffer 328 that buffers one or more requested packets read from the non-volatile storage media 205 prior to processing by the read data pipeline 303. The read synchronization buffer 328 is at the boundary between the non-volatile storage clock domain and the local bus clock domain and provides buffering to account for the clock domain differences.

In another embodiment, the read data pipeline 303 includes an output buffer 330 that receives requested packets from the alignment module 326 and stores the packets prior to transmission to the requesting device 155. The output buffer 330 accounts for differences between when data segments are received from stages of the read data pipeline 303 and when the data segments are transmitted to other parts of the storage controller 204 or to the requesting device 155. The output buffer 330 also allows the data bus 207 to receive data from the read data pipeline 303 at rates greater than can be sustained by the read data pipeline 303 in order to improve efficiency of operation of the data bus 207.

In one embodiment, the read data pipeline 303 includes a media decryption module 332 that receives one or more encrypted requested packets from the ECC correction module 322 and decrypts the one or more requested packets using the encryption key unique to the non-volatile storage device 122 prior to sending the one or more requested packets to the depacketizer 324. Typically, the encryption key used to decrypt data by the media decryption module 332 is identical to the encryption key used by the media encryption module 318. In another embodiment, the non-volatile storage media 205 may have two or more partitions and the storage controller 204 behaves as though it was two or more storage controllers 104 each operating on a single partition within the non-volatile storage media 205. In this embodiment, a unique media encryption key may be used with each partition.

In another embodiment, the read data pipeline 303 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 303 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 204.

In another embodiment, the read data pipeline 303 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 303 includes a read program module 338 that includes one or more user-definable functions within the read data pipeline 303. The read program module 338 has similar characteristics to the write program module 310 and allows a user to provide custom functions to the read data pipeline 303. The read program module 338 may be located as shown in FIG. 3, may be located in another position within the read data pipeline 303, or may include multiple parts in multiple locations within the read data pipeline 303. Additionally, there may be multiple read program modules 338 within multiple locations within the read data pipeline 303 that operate independently. One of skill in the art will recognize other forms of a read program module 338 within a read data pipeline 303. As with the write data pipeline 301, the stages of the read data pipeline 303 may be rearranged and one of skill in the art will recognize other orders of stages within the read data pipeline 303.

The storage controller 204 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 301 with each pipeline stage pulling the appropriate command or instruction as the respective packet is executed by that stage. Similarly, commands or instructions may be simultaneously loaded into the control queues 342 for a packet being requested from the read data pipeline 303 with each pipeline stage pulling the appropriate command or instruction as the respective packet is executed by that stage. One of skill in the art will recognize other features and functions of control and status registers 340 and control queues 342.

The storage controller 204 and or non-volatile storage device 122 may also include a bank interleave controller 344, a synchronization buffer 346, a storage bus controller 348, and a multiplexer ("MUX") 350.

Figure 4:
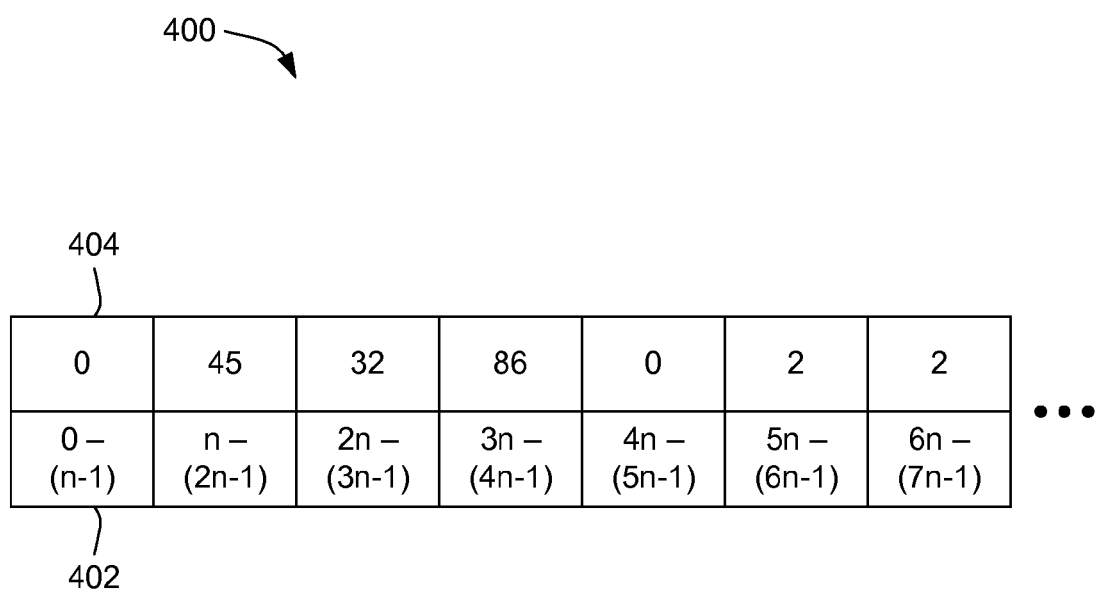
FIG. 4 depicts a schematic diagram of one embodiment of a log for storing read counts.

FIG. 4 depicts a schematic diagram of one embodiment of a log 400 for storing read touch counts. In one embodiment, the log 400 is stored on the storage device 122. In other embodiments, the log 400 is stored on the memory device 108 or on a different storage device 122. In other embodiments, the read touch counts may be stored or tracked according to any method for tracking read touch counts. Although the log 400 described herein is shown in conjunction with the caching system 100 of FIG. 1, the log 400 may be used in conjunction with any caching system 100. Alternatively, the caching system 100 of FIG. 1 may be used in conjunction with any method of tracking read touch counts.

Access requests to a backing store 118 include commands or signals to access one or more particular locations on the backing store 118. Access requests include read access requests to read data from a range of addresses on the backing store 118 and write access requests to write data to a range of addresses on the backing store 118. When a sector 402 or group of sectors 402 is accessed to read the data stored at the sector 402 or group of sectors 402, a counter 404 representing the number of current read touch counts or read access requests at the sector 402 or group of sectors 402 is incremented. In one embodiment, the counter 404 is incremented only in response to successfully completing a read operation associated with the read access request. Unsuccessful read operations may not increment the counter 404 for the corresponding read access requests.

The depicted log 400 is a simplified representation of stored read touch counts for a plurality of sectors 402 on the backing store 118. In one embodiment, the log 400 tracks the read touch counts for each individual sector 402. In another embodiment, the log 400 tracks the read touch counts for a specified number of sectors 402. The log 400 may track the read touch counts for any range of addresses on the backing store 118. For example, as shown in FIG. 4, the first group or sector 402 includes addresses from 0-(n−1). The second group or sector 402 includes addresses from n-(2n−1). The third group or sector 402 includes addresses from 2n-(3n−1), etc. The counters 404 are represented in the log 400 by the numbers corresponding to each group or sector 402. While the counters 404 are shown with the numbers in FIG. 4, the number of read touch counts may be larger or smaller than depicted.

Each range of addresses may store data unrelated from the data stored in other ranges of addresses. In some embodiments, data stored in one range of addresses may be related to data stored in another range of addresses. This may result in read access requests for multiple ranges of addresses corresponding to a single read operation, as shown in FIG. 4. Related data may or may not be stored in physically adjacent ranges of addresses.

The number of read touch counts for each range of addresses stored in the log 400 may be compared with a threshold number of read touch counts to determine whether to cache the data in the storage device 122. The threshold number of read touch counts may be stored as a read touch threshold. In one embodiment, when the number of read touch counts satisfies the read touch threshold, the write admittance policy for caching the data for the specific range of addresses is set to a write-through policy. In another embodiment, the write admittance policy is set to a write-back policy when the number of read touch counts satisfies the read touch threshold. If the number of read touch counts does not satisfy the read touch threshold, the write admittance policy is set to a write-around policy.

In one embodiment, read access requests that include sequential touches to a single range of addresses (or read operations for sequential addresses in the single range of addresses) are only counted as a single read touch count to prevent inflating the read touch count for the range/group of addresses. This may allow the write admittance policy to prioritize random access requests to the backing store 118 over sequential accesses to the backing store 118. Prioritizing the random access requests over sequential accesses may improve the overall performance of the storage device 122 and caching system 100 by selecting the most time "expensive" and most frequently accessed data on the backing store 118 to cache on the storage device 122.

In one embodiment, the counters 404 are configured to reset to zero after a certain amount of time has passed without any read access requests to the corresponding ranges of addresses. In this manner, "aging out" the read touch counts helps ensure that data that was previously frequently used, but that is now currently unused or infrequently used, does not continue to unnecessarily populate the storage device 122. In another embodiment, the counters 404 are configured to reset to zero in response to evicting data from the corresponding range of addresses. In another embodiment, the counters 404 are configured to reset in response to resetting or rebooting the storage device 122, or any action which may invalidate the data stored at the corresponding range of addresses.

In one embodiment, if data corresponding to a particular range of addresses is moved to a different range of addresses on the backing store 118, such as during a disk management process, the log 400 may be updated to reflect the new location of the data, and the current read touch count for the range of addresses is moved to the new location. In other embodiments, if data is moved from one range of addresses to another, the counter 404 may be reset to zero.

Figure 5A:
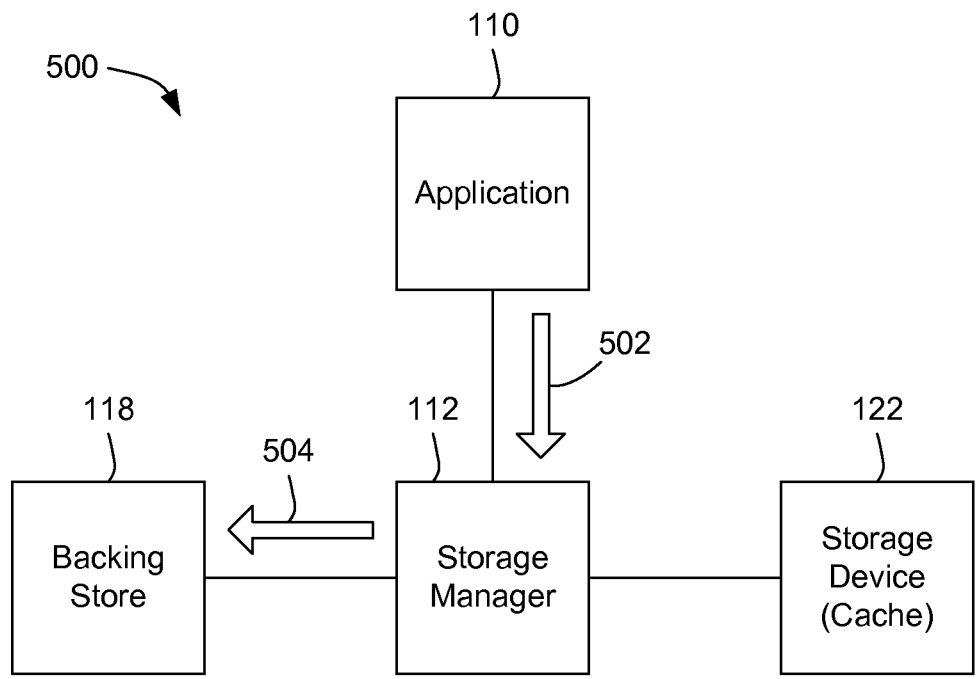
FIG. 5A depicts a block diagram of one embodiment of a data flow for a write-around admittance policy.
Figure 5B:
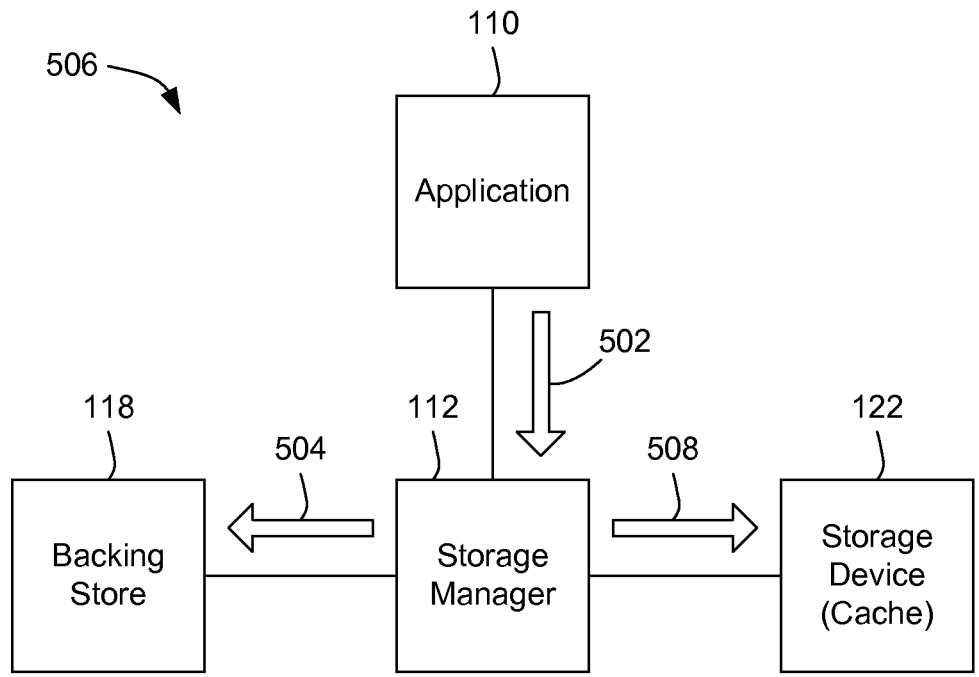
FIG. 5B depicts a block diagram of one embodiment of a data flow for a write-through admittance policy.
Figure 5C:
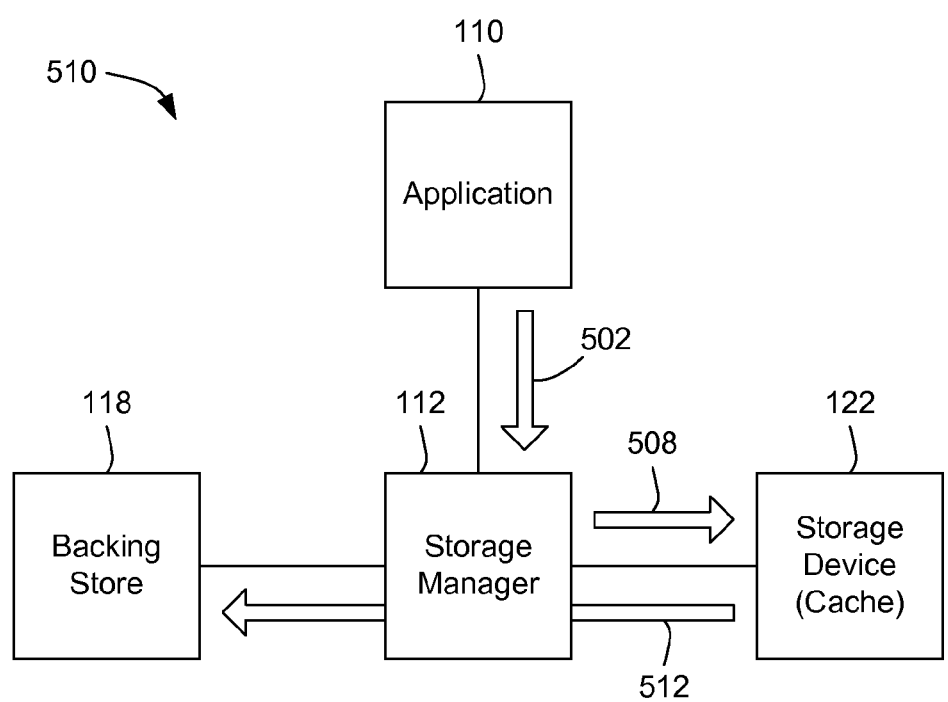
FIG. 5C depicts a block diagram of one embodiment of a data flow for a write-back admittance policy.

FIGS. 5A-5C depict block diagrams of embodiments of a data flow for various write admittance policies. In general, the application 110 submits a write operation to the storage manager 112 to write data to the backing store 118. The storage manager 112 interprets the write operation and determines where to write the data on the backing store 118. The storage manager 112 may determine where to write the data in conjunction with other components, such as the block storage layer 114 and the disk controller 116 of FIG. 1. The storage manager 112 also determines whether to cache the data on the storage device 122 based on the write admittance policy for the specified locations on the backing store 118.

The storage manager 112 FIG. 5A depicts a block diagram of one embodiment of a data flow 500 for a write-around admittance policy. In one embodiment of a caching system 100, the application 110 submits 502 the write operation to the storage manager 112. The storage manager 112 determines that the data should be written to a specific location of the backing store 118. The storage manager 112 also determines that the number of read touch counts for the specific location does not satisfy the read touch threshold. Because the number of read touch counts does not satisfy the read touch threshold, the data corresponding to the write operation is written 504 to the backing store 118, but not to the storage device 122, according to the write-around policy. Thus, if the read touch threshold includes a threshold touch count of at least one or greater, the data corresponding to the first write operation to a specific location on the backing store 118 is not written to the storage device 122.

Subsequent write operations for the specific location on the backing store 118 may occur after at least one read operation to the specific location on the backing store. In one embodiment, each read operation to the specific location increments the counter that stores the number of read touch counts. When the number of read touch counts satisfies the read touch threshold, the write admittance policy for the specific location may be changed. As shown in FIG. 5B and FIG. 5C, the write admittance policy may be changed to a write-through policy or a write-back policy.

FIG. 5B depicts a block diagram of one embodiment of a data flow 506 for a write-through admittance policy. The storage manager 112 receives a write operation from the application 110. The storage manager 112 then determines where on the backing store 118 the data is to be written. If the number of read touch counts for the specific location satisfies the read touch threshold, the storage manager 112 writes 504 the data to the specific location on the backing store and also caches 508 the data on the storage device 122. The write operation to the backing store 118 and the caching operation to the storage device 122 are performed simultaneously or approximately simultaneously, according to the write-through policy.

FIG. 5C depicts a block diagram of one embodiment of a data flow 510 for a write-back admittance policy. The storage manager 112 receives a write operation from the application 110. The storage manager 112 then determines where on the backing store 118 the data is to be written. If the number of read touch counts for the specific location satisfies the read touch threshold, the storage manager 112 caches 508 the data on the storage device 122. The data on the storage device 122 is then written 512 to the backing store 118 at a later time according to a write-back policy.

Although the write admittance policy is described herein as a write-through or a write-back policy, the write admittance policy may be any policy for caching the data when the number of read touch counts for the corresponding write operation satisfies the read touch threshold.

Figure 6:
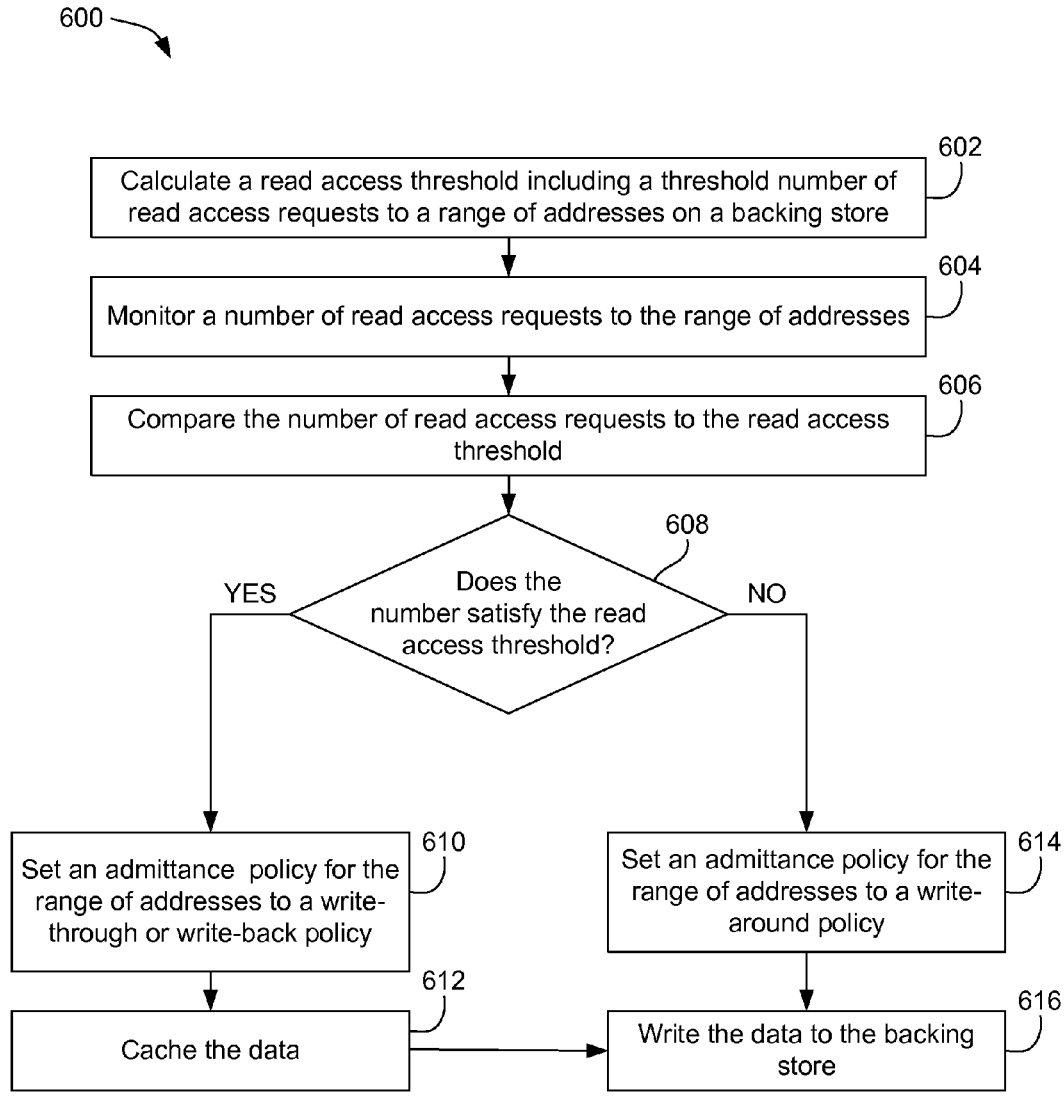
FIG. 6 depicts a flow chart diagram of one embodiment of a method for adjusting a write admittance policy for a memory cache.

FIG. 6 depicts a flow chart diagram 600 of one embodiment of a method for setting a write admittance policy for a memory cache. Although the method is shown and described with operations of the caching system 100 of FIG. 1, other embodiments of the method may be implemented with other caching systems 100.

In one embodiment of the method, the caching system 100 calculates 602 a read access threshold that includes a threshold number of read access requests (or read touch counts) to a range of addresses on a backing store 118. The range of addresses may correspond to any number of physical addresses. For example, the range of addresses may correspond to a sector, logical block, or other grouping of physical addresses on the backing store 118. The read access requests correspond to one or more read operations from an application 110 of the caching system 100. In one embodiment, a storage device 122 for caching data being written to the backing store 118 includes a plurality of storage tiers, and the caching system 100 calculates a read access threshold separately for each tier of the storage device 122. In another embodiment, the caching system 100 accesses a read access threshold that has already been calculated or otherwise determined.

The caching system 100 monitors 604 the number of read access requests to the range of addresses on the backing store. The number of read access requests for each range of addresses on the backing store 118 may be stored in a log 400 or other data file. The log 400 may be stored on any storage device 122, and may be accessed by the caching system 100 when determining whether to cache data in the storage device 122. In one embodiment, sequential read access requests to the range of addresses are counted as a single read access request for the current number of read access requests in the log 400. In one embodiment, the caching system 100 resets the number of read access requests to zero after a specified amount of time without any read access requests to the range of addresses. The specified amount of time may be determined based on an ageing-out policy for log pages associated with the storage device 122 or on other criteria. In one embodiment, the caching system 100 resets the number of read access requests to zero in response to evicting data stored at the address. In another embodiment, the caching system 100 resets the number of read access requests for the address to zero in response to resetting or rebooting the storage device 122 on which a memory element 126 corresponding to the address is located.

The caching system 100 compares 606 the number of read access requests to the read access threshold and checks 608 if the number of read access requests satisfies the read access threshold. In one embodiment, the caching system 100 generates an output based on the comparison of the number of read access requests to the read access threshold. The output indicates whether the number of read access requests satisfies the read access threshold.

If the number of read access requests satisfies the read access threshold, the caching system 100 sets 610 a write admittance policy for the range of addresses to a policy that caches the data corresponding to write operations for the range of addresses. The data is cached 612 to the storage device 122 and written 616 to the backing store 118. In one embodiment, the write admittance policy is set to a write-through policy. In another embodiment, the write admittance policy is set to a write-back policy.

If the number of read access requests does not satisfy the read access threshold, the caching system 100 sets 614 the write admittance policy to a write-around policy. Thus, write operations to the range of addresses do not result in data being cached and the data is written 616 only to the backing store 118 without caching. The caching system 100 excludes data associated with the write access request for the address from caching on the storage device 122 in response to determining that the number of read access requests does not satisfy the read access threshold.

In one embodiment, the caching system 100 includes a threshold number of addresses for caching sequential data to the storage device 122. For sequential data that has a length as long as or greater than the threshold number of addresses, only a portion of the sequential data is cached to the storage device 122.

While many embodiments are described herein, some embodiments relate to a method. A method includes monitoring a number of read access requests to an address for data stored on a backing store. The method also includes comparing the number of read access requests to a read access threshold. The read access threshold includes a threshold number of read access requests for the address. The method also includes caching data corresponding to a write access request to the address in response to determining that the number of read access requests satisfies the read access threshold. Other embodiments of the method are described herein. Embodiments of an apparatus and a system are also described herein.

An embodiment of the caching system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or memory devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method, comprising:
    tracking read touch counts, the read touch counts monitoring a number of read access requests directed to respective addresses of a backing store;
    determining a read touch count of an address of a write access request by use of the read touch counts; and
    adjusting a caching policy for data of the write access request based on the determined read touch count.

2. The method of claim 1, wherein adjusting the caching policy comprises adjusting a write admittance policy for the write access request to one of a write-through policy, a write-back policy, and a write-around policy.

3. The method of claim 1, further comprising excluding the data of the write access request from cache admission in response to determining that the determined read touch count does not satisfy a read access threshold.

4. The method of claim 1, further comprising adjusting a write admittance policy for the write access request to a write-around policy in response to the determined read touch count failing to satisfy a read access threshold.

5. The method of claim 1, wherein the address of the write access request comprises a logical address from a client application corresponding to the write access request, and wherein the logical address corresponds to a physical address on the backing store.

6. The method of claim 1, wherein tracking the read touch counts comprises tracking read touch counts for respective address sets, the address sets corresponding one or more addresses of the backing store, the method further comprising:
    detecting a quantity of read access requests to addresses of a particular one of the address sets; and
    incrementing a read touch count of the particular address set by an amount that differs from the quantity of detected read access requests.

7. The method of claim 1, wherein tracking the read touch counts comprises monitoring a number of read access requests to respective groups of addresses, wherein a plurality of sequential read access requests to addresses in a particular group of addresses are tracked as a single read access request for the particular group.

8. The method of claim 1, further comprising resetting a read touch count of an address to zero after a specified amount of time without receiving a read access request for the address.

9. The method of claim 8, further comprising determining the specified amount of time based on an ageing-out policy.

10. The method of claim 1, further comprising resetting a read touch count of a particular address in response to evicting data corresponding to the particular address.

11. The method of claim 1, further comprising updating a read touch count for a first address in response to one or more of determining that data has been relocated to the first address from another address of the backing store, and determining that data has been relocated from the first address to another address of the backing store.

12. An apparatus, comprising:
    a storage manager configured to manage cache storage for a storage system, wherein the storage manager is further configured to:
        receive a request to write data to a particular address of the non-volatile storage system,
        calculate a read access metric for the particular address, the read access metric quantifying read access requests directed to the particular address; and
        determining whether to admit data of the write request into the cache storage based on the read access metric for the particular address.

13. The apparatus of claim 12, wherein the storage manager is further configured to exclude the data of the write request from the cache storage in response to determining that the read access metric for the particular address does not satisfy a threshold.

14. The apparatus of claim 12, wherein the storage manager is further configured to admit the data of the write request into the cache storage in response to determining that the read access metric for the particular address satisfies a threshold.

15. The apparatus of claim 12, wherein the storage manager is configured track read access requests to addresses of the storage system by one or more of,
    incrementing a touch count of a specified address of the storage system in response to detecting a read request pertaining to the specified address, and
    incrementing a touch count for a group of two or more addresses in response to detecting a read request pertaining to an address in the group.

16. The apparatus of claim 12, wherein the storage manager is further configured to admit the data of the write request into the cache storage in one of a write-through mode and a write-back mode in response to the read access metric of the particular address exceeding a threshold.

17. The apparatus of claim 12, wherein the storage manager is further configured to reset a read access metric of an designated address of the backing store in response to one or more of failing to detect a read access request directed to the designated address within a time threshold, determining that data of the designated address has been relocated, determining that data of the specified address has been evicted from the cache storage, and detecting a restart of the cache storage.

18. The apparatus of claim 12, wherein the storage manager is further configured to update a read access metric of a designated address of the storage system in response to one or more of data being moved to the designated address, and data being moved from the designated address.

19. The apparatus of claim 12, wherein the storage manager is further configured to maintain a log comprising read access metrics for addresses of the storage system.

20. A non-transitory computer-readable storage medium comprising instructions configured to cause a computing device to perform operations, the operations comprising:
- maintaining read access counts to track read accesses to respective addresses of a storage system;
- determining read access counts associated with data segments being written to the storage system, wherein a read access count associated with a data segment being written to the storage system at a particular address corresponds to a read access count maintained for the particular address to track read accesses to the particular address; and
- caching data of selected data segments being written to the storage system in a cache in response to read access counts for the selected data segments satisfying a threshold.

* * * * *